United States Patent Office 3,274,248
Patented Sept. 20, 1966

3,274,248
N-1,1-BIS-[AMINOPHENYL]-PROPYL-AMINES AND SALTS THEREOF
Kálmán Harsányi, Dezsö Korbonits, Kálmán Takács, László Tardos, György P. Leszkovszky, and Ilona Erdély, all of Budapest, Hungary, assignors to Chinoin Gyógyszer-és Vegyészeti Termékek Gyára RT., Budapest, Hungary, a firm
No Drawing. Filed Aug. 1, 1963, Ser. No. 299,181
Claims priority, application Hungary, Aug. 16, 1962, CI–409
9 Claims. (Cl. 260—570)

This invention is related to certain new propylamine derivatives, methods for their preparation and pharmaceutical compositions containing the same.

It has been found, that compounds of the general formula

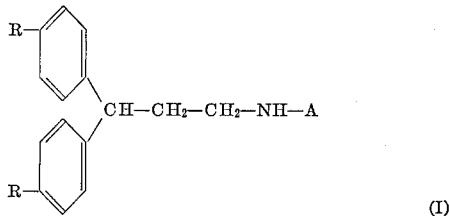

are valuable compounds which may be used in pharmacy on the basis of their coronary dilatant, antitussive or hypotensive activity (where in the formula R stands for a nitro, acylamino, or $(R^1)_2=N$—group, where $R^1$ stands for hydogen, alkyl, aralkyl or cycloalkyl, while A stands for a cycloalky group, or for a cycloalkyl group, condensated with an aromatic ring and/or substituted or for the group

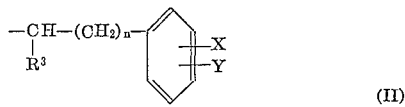

where $n$ means the whole numbers O–3, X means hydrogen, a hydroxy, alkoxy or alkyl group, Y means hydrogen, an alkoxy or alkyl group and $R^3$ means a short-chain alkyl group.

It has been found further, according to the present invention that compounds of the formula I may be prepared when condensating and reducing amines of the formula

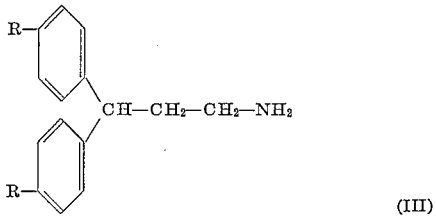

with ketones of the formula

where R has the same meaning as stated above, while B stands for the group

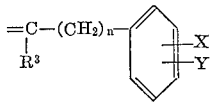

where $n$ means the numbers O–3, X stands for hydrogen, a hydroxy, alkoxy or alkyl group and Y stands for hydrogen, an alkoxy or alkyl group and $R^3$ for a short chain alkyl group or O=B stands for cycloalkanone or for cycloalkanone condensated with an aromatic cycle and/or substituted.

Reduction may be accomplished after condensation by means of alkaline metal or alkaline earth metal borohydrides, preferably with sodium borohydride. It is preferable to use an organic solvent e.g. alcohol as a solvent. This method is preferred when R stands for a nitro group.

In compounds where R stands for an acylamino or $(R^1)_2=N$ group, reduction may be accomplished during or after condensation by means of catalytic hydrogenation. Raney-nickel, palladium, or platinum may be used as a catalyst and the reaction is carried out in the presence of an organic solvent, preferably in alcohol as a medium. Reduction may be carried out by means of nascent hydrogen e.g. with sodium amalgamate or sodium in alcohol as a medium. For catalytic hydrogenation ethyl acetate, dioxane, tetrahydrofurane may be used as solvents. Temperature of the reaction is about 25–80° C.

The products are recovered from the reaction mixture by the usual methods after splitting the metal complex or filtration of the catalyst.

The product may be obtained with the above process in the form of the free base or in the form of a salt formed with an appropriate acid. From both the base and the salts, another salt formed with an organic or inorganic acid may be prepared the biological or solubility properties of which overcome those of the originally prepared ones. Thus the maleic, acetic, lactic, gluconic, citric, ascorbic, or tartaric salts, or salts formed with mineral acids e.g. sulphuric, hydrochloric, hydrobomic, phosphoric acid, etc. are readily prepared.

The compounds provided in the present invention may be used as active ingredients of pharmaceutical compositions.

The said pharmaceutical compositions may be in form suitable for oral, rectal or parenteral use. The compositions may contain sweetening, flavouring, colouring and preserving agents. Compositions intended for oral use may be prepared according to any method known to the art for the manufacture of pharmaceutical compositions, such as tablets, coated pills, suspensions, solutions, powders or granules, capsules and emulsions. The tablets may contain non-toxic pharmaceutical excipients commonly used in the manufacture of tablets, thus they may contain lubricating, binding, granulating and disintegrating agents and diluents.

Suspensions or solutions may contain the following excipients: suspending agents, dispersing or wetting agents, preservatives, thickening agents. Powders and granules may contain wetting and suspending agents.

The pharmaceutical compositions may be in the form of a sterile injectable preparation, such as an aqueous solution or suspension, or in an other non-toxic parenterally acceptable diluent or solvent.

The starting materials of the present invention (i.e. the compounds of Formula III) are new compounds, which are to be prepared by reduction of the corresponding nitriles or by desacylating the corresponding N-acyl derivatives.

Further details of the invention are to be found in the examples.

Example 1a 10.5 g. of $\gamma,\gamma$-bis-(4-diethylaminophenyl)-propylamine and 3.60 g. of acetophenone are allowed to stand in 40 ml. of methanol at room temperature. The solution is hydrogenated at 50° C. and 10–15 atm. in the presence of palladium charcoal in an autoclave. The catalyst is filtered off, the solution evaporated. The residue (13.4 g.) is dissolved in 40 ml. of anhydrous ethanol. On addition of 45 ml. of anhydrous ethanol containing 13% of hydrochloric acid and 60 ml. of ethyl acetate 15.1 g. of white, crystalline N-[1-phenyl-ethyl-(1)]-1,1-bis-(4-diethylaminophenyl)-propyl-(3)-amine trihydrochloride and obtained. M.P. 247° C. (decomposition). Analysis: C=65.48% (calculated 65.65), H=8.12% (calculated 8.17), N=7.63% (calculated 7.41).

Example 1b 81.4 g. of $\gamma,\gamma$-bis-(4-diethylaminophenyl)-propylamine are reacted with 29.30 g. of acetophenone according to the method described in Example 1. The catalyst is filtered off, the solution evaporated and the residue weighing 105.7 g. is dissolved in 680 ml. of 96% ethanol, whereupon the solution is filtered and 230 ml. of a N hydrochloric acid solution are added. The precipitating white crystals are allowed to stand in a refrigerator for a night, whereupon they are filtered and washed with 96% alcohol. Thus 77.2 g. of the product are obtained. M.P. 238–239° C. The salt is purified by recrystallization from ethanol. Thus 62.5 g. of pure N-[1-phenyl-ethyl-(1)]-1,1-bis-[4-diethylaminophenyl]-propyl-(3)-amine-hydrochloride are obtained. M.P. 240° C. Analysis: C=75.23% (calculated 75.34), H=8.98% (calculated 8.97), N=8.47% (calculated 8.50).

Pharmacological tests gave the following results: toxicity on mice $LD_{50}$=55 mg./kg. intravenously. In case of coronary stenosis caused by vasopressine the electrocardiograph indicated the coronary dilatory effect of the compound. ($ED_{50}$=5 mg./kg. if administered intravenously. In the dose of 1 mg./kg. the compound decreases the blood-pressure of a sleeping cat by 30 Hg mm. during 1 minute. The product inhibits the coughing of a guinea pig, coused by inhalation of 0.5 N sulphuric acid, $ED_{50}$=9.4 mg./kg., when administered subcutaneously. The criterium of the inhibition is when the animals do not cough during the period of 3 minutes. Tested according to the method of Domenjoz the coughing inhibitory effect of the product was found to be 1 mg./kg. on cats. The compound does not exhibit respiration volume decreasing effect (opposite to codeine, which decreases respiration volume in significant extent already in the dose of 8 mg./kg., when administered subcutaneously).

Example 2

10.59 g. of $\gamma,\gamma$-bis-(4-diethylaminophenyl)propylamine and 4.02 g. of phenylacetone are hydrogenated in 200 ml. of methanol in the presence of 1.0 g. of charcoal-palladium catalyst at 5–15 atm. and 55–60° C. for 8 hours. The catalyst is filtered, and washed with methanol, whereupon the solution is evaporated in vacuo.

The residue is dissolved in 60 ml. of 96% alcohol, the solution is filtered and 11 g. of alcohol containing 10% of hydrochloric acid are added. The precipitated white crystals are stored in a refrigerator for a night, whereupon they are filtered, washed with 96% alcohol and dried. Thus 10.32 g. of the salt are obtained, which is recrystallized from 96% alcohol. 9.00 g. of N-[1-phenyl-propyl-(2)]-1,1-bis-(4-diethylaminophenyl)-propyl-(3)-amine hydrochloride are obtained. M.P. 210° C. Analysis: N=8.27% (calc. 833). In Langendorff preparation $100\gamma$ doses of the product increase the coronary flow by 90%. On rats narcotized by ether, the product checks coronary stenosis caused by 3 u./kg. Glanduitrine ($ED_{50}$=0.65 mg./kg.). Slight spasmolytic effect on isolated intestines. The blood-pressure of narcotized cats is decreased by 25 Hg mm. when administering 1 mg./kg. doses intravenously (administration in suspension). The blood pressure of narcotized cats is decreased by 30 Hg mm. when administering 1 mg./kg. doses intravenously in alcohol solution. Toxicity $DL_{50}$=195 mg./kg. i.p. in alcohol solution on cats.

Example 3

10.59 g. of $\gamma,\gamma$-bis-(4-diethylaminophenyl)-propylamine and 4.93 g. of p-hydroxy-benzyl acetone are hydrogenated in 200 ml. of methanol in the presence of 1 g. of palladium-charcoal catalyst at 5–15 atm. and 55–60° C. The reaction mixture is worked up according to the method described in Example 2. The product is N-[1-(4-hydroxy-phenyl)-butyl-(3)]-1,1-bis-(4-diethylaminophenyl)-propyl-(3)-amine hydrochloride. M.P. 215° C. Analysis: N=7.90% (calc. 7.81).

Example 4

10.59 g. of $\gamma,\gamma$-bis-(4-diethylaminophenyl)-propylamine, 4.93 g. of anizylacetone, 200 ml. of methanol and 1 g. of palladium charcoal catalyst are hydrogenated at 5–15 atm. and 55–60° C. in a metal hydrogenating apparatus. The reaction mixture is worked up according to the process described in Example 2. The product is N-[1-(4-methoxy-phenyl)-propyl-(2)]-1,1-bis-(4-diethylaminophenyl)-propyl-(3)-amine hydrochloride M.P. 218° C. Analysis: C=73.56% (calc. 73.64), H=9.08% (calc.: 8.99), N=7.73% (calc. 7.81).

Example 5

The mixture of 6.5 g. of $\gamma,\gamma$-bis-(4-acetylaminophenyl)-propylamine, 2.0 g. of cyclohexanone, 0.8 g. of palladium charcoal catalyst and 120 ml. of methanol is hydrogenated at 10–15 atm. and 50–60° C. in an autoclave. On filtering the catalyst and evaporating the solution 7.5 g. of the residue are obtained.

5.5 g. of distillation residue are refluxed with 50 ml. of 1:1 diluted aqueous hydrochloric acid for 20 hours. The N-cyclohexyl-$\gamma,\gamma$-bis-(4-aminophenyl)-propylamine hydrochloride precipitates; after filtration it is dissolved in water and the solution made alkaline. Water is decanted and the precipitated dense oil is washed with water. A part of the anhydrous gum-like base is soluble in ethyl acetate. The hot ethyl-acetate solution is washed and some material, melting at 150–155° C. precipitates. The cold ethylacetate solution is evaporated and on recrystallization from petrol N-cyclohexyl-$\gamma,\gamma$-bis-(4-aminophenyl)-propylamine is obtained. M.P. 112–113° C. Analysis: N=13.04% (calc. 12, 99).

Example 6

The mixture of 5.95 g. of $\gamma,\gamma$-bis-(4-dimethylaminophenyl)-propylamino, 2.40 g. of acetophenone, 0.8 g. of palladium charcoal catalyst and 30 ml. of methanol is hydrogenated at 50° C. and 10–15 atm. The catalyst is filtered, the solution evaporated and 8.0 g. of the distillation residue are obtained.

The above distillation residue is dissolved in 10 ml. of hot anhydrous ethanol and 15 ml. of anhydrous ethanol containing 25% of hydrochloric acid are added. Thus 8.42 g. of N-[1-phenyl-ethyl-(1)]-1,1-bis-(4-dimethylaminophenyl)-propyl-(3)-amine-trihydrochloride are obtained. M.P. 224° C. (decomp.).

The compound can be recrystallized from anhydrous ethanol.

Pharmacological tests of the above compounds gave the following results: The compound exhibits weak spasmolytic effect. Its toxicity amounts to $LD_{50}$=29 mg./kg. on mice if administered intravenously. The antitussive effect of the compound when examined according to the method described in Example 1 was found to be $ED_{50}$=19.8 mg./kg. on guinea pigs. In the case of coughing caused by 0.5% histamine the antitussive effect of the product was found to be $ED_{50}$=29 mg./kg.

Example 7

5.95 g. of γ,γ-bis-(4-dimethylaminophenyl)-propylamine and 1.96 g. of cyclohexanone are hydrogenated according to the method described in the previous example. The catalyst is filtered and N-cyclohexyl-γ,γ-bis-(4-dimethylaminophenyl)-propylamine trihydrochloride is formed from the distillation residue. The product weights 7.75 g. M.P. 221° C. (decomp.). The hydrochloride acid salt can be recrystallized from anhydrous ethanol. Analysis: C=61.36% (calc. 61.41), H=8.29% (calc. 8.24), N=8.56% (calc. 8.59).

The toxicity of the product amounts to $LD_{50}$=26 mg./kg. on mice, when administered intravenously.

Example 8

2.68 g. of phenylacetone and 5.95 g. of γ,γ-bis-(4-dimethylamino-phenyl)-propylamine are hydrogenated in 120 ml. of methanol in the presence of 1 g. of 8% palladium charcoal catalyst at 60° C. and 10–12 atm. When no more hydrogen is absorbed (6 hours of shaking) the catalyst is filtered and the alcohol is evaporated in vacuo. The residue 8.2 g. of yellowish oil are dissolved in 15 ml. of anhydrous ethanol and 15 ml. of 25% hydrochloric acid are added. On standing in a refrigerator 10.0 of colorless, crystalline N-[1-phenyl-propyl-(2)]-1,1-bis-(4-dimethylaminophenyl)-propyl-(3)-amine trihydrochoride crystallize slowly. M.P. 219–225° C. On recrystallization from anhydrous ethanol the melting point amounts to 230° C. Analysis: C=64.04% (calc. 63.98), H= 7.54% (calc. 7.68), N=8.07% (calc. 97.95).

The toxicity of the product was found to be 26 mg./kg. on mice, when administered intravenously.

Example 9

5.95 g. of γ,γ-bis-(4-dimethylaminophenyl)-propyl-(3)-amine and 3.28 g. of anizyl acetone are hydrogenated according to the method described in the previous example. The distillation residue weighs 8.50 g. and from this N-[1-(4-methoxy-phenyl)-propyl-(2)]-1,1-bis-(4-dimethylaminophenyl)-propyl-(3)-amine trihydrochloride is obtained. On recrystallization from anhydrous ethanol the melting point amounts to 232–233° C. The product weighs 8.18 g. Analysis: C=62.83% (calc. 62.75), H=7.51% (calc. 7.63), N=7.70 (calc. 7.56).

The toxicity of the product was found to be $LD_{50}$=29.5 mg./kg. on mice.

Example 10

5.95 g. of γ,γ-bis-(4-dimethylaminophenyl)-propylamine and 3.88 of veratryl acetone are hydrogenated according to the above method. The distillation residue (9.37 g.) is converted into the hydrochloric acid salt (9.95 g.) with anhydrous ethanol containing hydrochloric acid. The salt can be recrystallized from anhydrous ethanol and decomposes at 192° C. Thus N-[1-(3,4-dimethoxyphenyl)-propyl-(2)] - 1,1-bis - (4-dimethylaminophenyl)-propyl-(3)-amine trihydrochoride is obtained. Analysis: $LD_{50}$=44.5 mg./kg. on mice, when administered intravenously. The product exhibits spasmolytic and antitussive effect.

Example 11

2.96 g. (0.02 mole) of benzyl acetone and 5.95 g. (0.02 mole) of γ,γ-bis-(4-dimethylaminophenyl)-propylamine are hydrogenated in 120 ml. of methanol in the presence of 1 g. of 8% palladium charcoal catalyst at 60° C. and 10–12 atm. When the hydrogen absorption is completed the catalyst is filtered and the alcohol is distilled off in vacuo. The residue 8.47 g. of yellowish oil is dissolved in 15 ml. of anhydrous ethanol, whereupon salt formation is carried out with 15 ml. of alcohol containing 25% of hydrochloric acid. On standing in a refrigerator 10.4 g. of N-[1-phenyl-butyl-(3)]-1,1-bis-(4-dimethylaminophenyl)-propyl-(3)-amine trihydrochloride precipitate. M.P. 219–220° C. On recrystallization from alcohol the melting point amounts to 228–230° C. Analysis: C= 64.38% (calc. 64.61), H=7.55% (calc. 7.85), N=7.76% (calc. 7.78).

The toxicity of the product amounts to $LD_{50}$=26 mg./kg. on mice. The compound exhibits spasmolytic effect.

Example 12

3.28 g. of p-hydroxy-benzylacetone and 5.93 g. of γ,γ-bis-(4-dimethylaminophenyl) - propylamine are hydrogenated in 120 ml. of methanol in the presence of 1 g. of 8% palladium charcoal catalyst at 60° C. and 10–22 atm. When hydrogen absorption is completed the catalyst is filtered off and the solution is evaporated in vacuo. The residue 9.23 g. of yellowish oil is dissolved in 15 ml. of anhydrous ethanol and 15 ml. of anhydrous ethanol containing 25% of hydrochloric acid is added. On standing in a refrigerator N-[1-(4-hydroxy-phenyl)-butyl-(3)-]-1,1-bis-(4-dimethylaminophenyl)-propyl-(3)-amine trihydrochloride precipitates. M.P. 120–124° C. On recrystallization from the mixture of alcohol and ether the melting point amounts to 127° C. Analysis: N=7.37% (calc. 7.57).

The toxicity of the product amounts to $LD_{50}$=41 mg./kg. on mice, when administered intravenously.

The compound exhibits coronary dilatory and antitussive effect.

Example 13

7.06 g. of γ,γ-bis-(4-diethylaminophenyl)-propylamine and 4.16 g. of 3-phenyl-indanone-1 are hydrogenated in 120 ml. of 96% ethanol in the presence of 1.5 g. of 10% palladium charcoal catalyst at 60° C. and 10–12 atm. while shaking. When no more hydrogen is absorbed the catalyst is filtered and the solution is evaporated in vacuo, whereupon the residue 10 g. of yellowish oil is dissolved in 20 ml. of anhydrous ethanol and the pH value of the solution is adjusted to 3 by addition of alcohol containing 13% of hydrochloric acid. The reaction mixture is allowed to stand in a refrigerator, whereupon the precipitated colorless crystals are filtered. Thus 11.5 g. of N-[3-phenyl - indanyl - (1)] - 1,1-bis-(4-diethylaminophenyl)-propyl-(3)-amine trihydrochloride are obtained. M.P. 234–235° C. Analysis: Cl=15.8% (calc. 16.2).

Example 14

7.06 g. of γ,γ-bis-(4-diethylaminophenyl)-propylamine and 2.64 g. of indanone-1 are hydrogenated in the presence of 1.5 g. of 10% palladium charcoal catalyst in 120 ml. of 96% ethanol at 60° C. and 10–12 atm. while shaking. When hydrogen absorption is completed the solution is filtered and evaporated in vacuo. The residue 9.1 g. of yellowish oil is dissolved in 20 ml. of anhydrous ethanol, the solution is acidified with alcohol containing 13% of hydrochloric acid until the pH reaches the value of 3. On standing in a refrigerator 8.3 g. of N-[indanyl-(1)] - 1,1 - bis-(4-diethylaminophenyl)-propyl-(3)-amine trihydrochloride precipitate in form of colourless crystals. M.P. 242–244° C. Analysis: Cl=18.1%, (calc. 18.4).

The toxicity of the product amounts to $LD_{50}$=48.5 mg./kg. on mice when administered intravenously and 360 mg./kg. when administered per os also on mice. It decreases the coughing of a guinea pig caused by the spray inhalation of 0.5 N sulphuric acid, the effective dose being $ED_{50}$=26 (23–52) mg./kg. when administered per os. The duration of the effect was found to be approximately 3 hours. Tested on cats according to the method of Demonjoz, when narcosis was caused by 60 mg./kg. Intranarcon and coughing was caused by irritating the nervus laryngeus superior the antitussive effect of the product can be proved too. The compound was administered in doses of 2–5 mg./kg. intravenously and the effect lasted for 5–6 minutes. The per os administered dose of 50 mg./kg. did not influence the respiration number and volume on rabbits. The product exhibits weak spasmolytic effect when tested on isolated guinea pig intestine according to the method of Magnus; in the concentration of $2\times10^{-5}$ it inhibits the spasm caused by carbamylcholine.

On cats and rats narcotized by chloralose-urethane the product decreases blood-pressure for 1 minute in the dose of 1–2 mg./kg. administered intravenously and this effect cannot be prevented with atropine or antihistamine. On rats narcotized by ether the product prevents in intravenous administration the coronary dilation caused by 60 seconds later intravenously administered 3 u./kg. Glanduitrine (examined by EKG). The effective dose of the above test was found to be $ED_{50}=3.0$ (2.19–4.11) mg./kg. On Langendorff preparation of cats and rats 50–100γ doses of the product increase the coronary-flow by 50–100% for 2–3 minutes.

The product exhibits coronary dilatory, vasodilatory and antitussive effect.

*Example 15*

9.03 g. of γ,γ-bis-(4-nitrophenyl)-propylamine and 3.6 g. of acetophenone are refluxed in 75 ml. of benzene for an hour. The reaction mixture is evaporated in vacuo, the residue is dissolved in 220 ml. of methanol and the Schiff's base formed is reduced in portions with 1 g. of sodium-borohydride. The reaction mixture is evaporated in vacuo and 50 ml. of water are added, whereupon the mixture is subjected to extraction with ether. The ether-extract is evaporated, the residue is dissolved in anhydrous ethanol and salt-formation is effected by means of alcohol containing hydrochloride acid. Thus 9.7 g. of crystalline N-[1-phenyl-ethyl(1)]-1,1 - bis - (4-nitrophenyl)-propyl-(3)-amine hydrochloride are obtained. M.P. 237° C.

*Analysis.*—N=6.31% (calc. 6.55).

*Example 16*

6.02 g. of γ,γ-bis-(4-nitrophenyl)-propylamine, 2.96 g. of benzyl acetone and 50 ml. of benzene are boiled on a water-bath for an hour. The benzene is distilled off in vacuo, the residue is dissolved in 70 ml. of methanol and 0.8 ml. of water, whereupon 0.6 g. of sodium-borohydride are added in portions (in details). The solution warms to 40° C. When the addition of sodium-borohydride is completed the reaction mixture is allowed to stand at room-temperature for an hour, whereupon the pH-value is adjusted to 3 with hydrochloric acid. The solution is evaporated in vacuo until its volume decreases to 15 ml. and on addition of 15 ml. of 1:1 mixture of alcohol and ether crystallization takes place. The reaction mixture is allowed to stand in a refrigerator for a night, whereupon the crystals are filtered. Thus 5.6 g. of N-[1-phenyl-butyl-(3)]-1,1-bis - (4-nitrophenyl) - propyl-(3)-amine hydrochloride are obtained in form of colorless crystals. M.P. 170–171° C. On recrystallization from alcohol the melting point amounts to 180° C.

*Analysis.*—C=63.64% (calc. 63.89). H=6.19% (calc. 6.00).

In the dose of 4 mg./kg. the compound exhibits coronary dilatory effect. In the dose of 0.5–1 mg./kg. it decreases the blood-pressure of cats by 30–50 Hg mm. On isolated intestine in the concentration of $5\cdot10^{-5}$ the product stops the spasm caused by acetylcholine, barium chloride and histamine. In the dose of 20 mg./kg. it exhibits antitussive effect (on guinea pigs). The toxicity of the product was found to be $LD_{50}=25$ mg./kg. on mice when administered intravenously.

*Example 17*

6.02 g. of γ,γ-bis-(4-nitrophenyl)-propylamine, 1.97 g. of cyclohexanone and 50 ml. of benzene are boiled on a water-bath for an hour. The benzene is distilled off under reduced pressure, the residue is dissolved in the mixture of 70 ml. of methanol and 0.8 ml. of water, whereupon 0.6 g. of sodium borohydride are added in details. The solution warms to about 50° C. When the addition of borohydride is completed the solution is allowed to stand for 30 minutes and is evaporated in vacuo. After addition of 10 ml. of water the residue is extracted with ether (the total quantity of ether amounts to 40 ml.). The ether is dried over sodium sulphate, filtered and evaporated in vacuo. The residue (5 g. of oil) is heated with the solution of 1.57 g. maleic acid in 20 ml. of anhydrous alcohol. On cooling colorless crystals precipitate. Thus 4.98 g. of N-cyclohexyl-1,1-bis-(4-nitrophenyl)-propyl-(3)-amine hydrogen maleate are obtained. M.P.) 198–199° C. On recrystallization from alcohol the melting point amounts to 208° C. Analysis: N=8.32% (calc.. 8.41).

*Example 18*

6.02 g. of γ,γ-bis-(4-nitrophenyl)-propylamine, 2.68 g. of phenylacetone and 50 ml. of benzene are boiled on water-bath for an hour. The benzene is distilled off under reduced pressure, the residue is dissolved in 70 ml. of methanol and 0.8 ml. of water, whereupon 0.5 g. of sodium borohydride are added in portions. (The mixture warms to the temperature of about 40° C.) When the addition of the borohydride is completed the reaction mixture is allowed to stand at room-temperature for 30 minutes, whereupon it is evaporated, the residue is dissolved in 20 ml. of anhydrous ethanol and the solution is acidified with 60 ml. of anhydrous alcohol containing 13% of hydrochloric acid. The precipitation of a crystalline product starts immediately. Thus 6.9 g. of N-[1-phenylpropyl-(2)]-1,1-bis-(4-nitrophenyl)-propyl-(3)-amine hydrochloride are obtained. M.P. 235° C. Anlysis: N=9.09% (calc. 9.21), C=63.50% (calc. 63.19), H=5.33% (calc. 5.72).

*Example 19*

9.31 g. of γ,γ-bis-(4-di-n-butylaminophenyl)-propylamine and 2.40 g. of acetophenone are dissolve in 100 ml. of methanol and the solution is allowed to stand at room temperature for a day. The reaction mixture is hydrogenated in a hydrogenating apparatus in the presence of 2 g. of charcoal-palladium catalyst at 55–60° C. and 5–15 atm. The catalyst is filtered off, the solution evaporated in vacuo, the residue is dissolved in 50 ml. of anhydrous alcohol, whereupon 15 ml. of anhydrous alcohol containing 10% of hydrochloric acid and 50 ml. of ether are added. The reaction mixture is allowed to stand in a refrigerator, the precipitated white crystalline product is filtered, washed with the mixture of anhydrous alcohol and ether and dried. Thus 9.20 g. of N-[1-phenyl-ethyl-(1)] - 1,1 - bis - (4 - di - n - butylaminophenyl) - propyl-(3)-amine trihydrochloride are obtained. M.P. 245° C. (decomp.). Analysis: N=6.54% (calc. 6.16).

*Example 20*

The components are compounded and finished in form of tablets according to usual methods. The composition of a tablet is the following:

|  | Mg. |
|---|---|
| N - [indanyl - (1)] - 1,1 - bis - (4 - diethylaminophenyl)-propyl-(3)-amine trihydrochloride | 30.0 |
| Lactose | 49.0 |
| Gelat. alb. | 1.5 |
| Amylum solani | 15.0 |
| Talcum | 3.0 |
| Magn. stearinate | 1.0 |

*Example 21*

The components are compounded and finished in form of tablets according to usual methods. The composition of a tablet is the following:

|  | Mg. |
|---|---|
| N - [indanyl - (1)] - 1,1 - bis - (4 - diethylaminophenyl)-propyl-(3)-amine trihydrochloride | 30.0 |
| Reserpine | 0.1 |
| Lactose | 49.0 |
| Gelat. alb. | 1.5 |
| Amylum solani | 15.0 |
| Talcum | 3.0 |
| Magn. stearinate | 1.0 |

Example 22

The components are compounded and finished in form of tablets according to usual methods. The composition of a tablet is the following:

|  | Mg. |
|---|---|
| N - [1 - phenyl - propyl - (2)] - 1,1 - bis - (4 - diethylaminophenyl)-propyl-(3)-amine trihydrochloride | 10.0 |
| Lactose | 49.5 |
| Gelat. alb. | 1.5 |
| Amylum solani | 15.0 |
| Talcum | 3.0 |
| Magn. stearinate | 1.0 |

What we claim is:

1. A material selected from the group consisting of compounds having the formula:

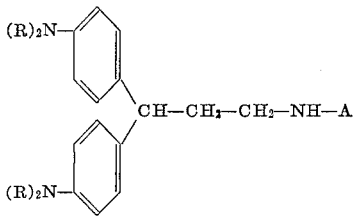

wherein R is selected from the group consisting of hydrogen, oxygen, and lower alkyl radicals containing from about 1 to about 4 carbon atoms, and A is selected from the group consisting of cyclo-hexyl, indanyl, 3-phenyl indanyl, and radicals having the formula:

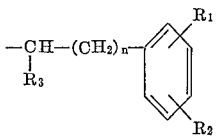

wherein $R_1$ and $R_2$ are selected from the group consisting of hydrogen, hydroxy, and alkoxy radicals, $R_3$ is a short chain alkyl radical and $n$ is an integer from about 0 to about 3 and salts thereof.

2. A compound having the formula:

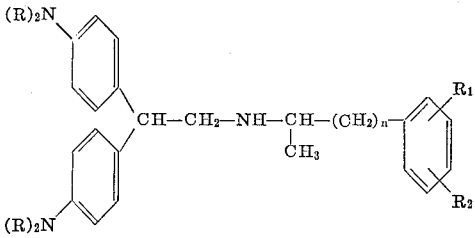

wherein $n$ is an integer from about 0 to about 3 and $R_1$ and $R_2$ are selected from the group consisting of hydrogen, hydroxy and alkoxy radicals, and R is selected from the group consisting of hydrogen, oxygen and lower alkyl radicals containing from about 1 to 4 carbon atoms.

3. N - [1 - phenyl-ethyl-(1)]-1,1-bis-(4-diethylaminophenyl)-propyl-(3)-amine.

4. N - cyclohexyl - γ,γ - bis-(4-aminophenyl)-propyl-amine.

5. N - [1 - (3,4-dimethoxy-phenyl)-propyl-(2)]-1,1-bis-(4-dimethylaminophenyl)-propyl-(3)-amine.

6. N - [1-phenyl-butyl-(3)]-1,1-bis-(4-dimethylaminophenyl)-propyl-(3)-amine.

7. N - [3-phenyl-indanyl-(1)]-1,1-bis-(4-diethylaminophenyl)-propyl-(3)-amine.

8. N - [indanyl - (1)]-1,1-bis-(4-diethylaminophenyl)-propyl-(3)-amine.

9. N - [1-phenyl-ethyl-(1)]-1,1-bis-(4-di-n-butylaminophenyl)-propyl-(3)-amine.

References Cited by the Examiner

UNITED STATES PATENTS 3,152,173  10/1964  Ehrhart et al. ____ 260—570 XR

FOREIGN PATENTS 627,139  7/1949  Great Britain.

CHARLES B. PARKER, *Primary Examiner.*

ROBERT V. HINES, *Assistant Examiner.*